United States Patent [19]

Barker

[11] Patent Number: 4,796,844
[45] Date of Patent: Jan. 10, 1989

[54] BRACKET FOR USE IN SECURING AN ELECTRIC METER BASE

[76] Inventor: Ronald Barker, 17 Satok Terrace, West Hill, Ontario, Canada, M1E 3N4

[21] Appl. No.: 125,690

[22] Filed: Nov. 27, 1987

[51] Int. Cl.⁴ .............................................. F16L 3/08
[52] U.S. Cl. ................................ 248/222.2; 248/304; 248/305; 248/339
[58] Field of Search ............... 248/222.2, 220.2, 216.1, 248/301, 304, 305, 544, 546, 322, 339, 227, 306, 490; 211/88; 232/17, 19, 39; 40/152.1, 617

[56] References Cited

U.S. PATENT DOCUMENTS

| | | | |
|---|---|---|---|
| 2,711,873 | 6/1955 | Larin | 248/301 X |
| 3,294,356 | 12/1966 | Sherman | 248/301 X |
| 3,923,278 | 12/1975 | Marcil | 248/301 |
| 4,026,510 | 5/1977 | Holmes | 248/216.1 X |
| 4,036,369 | 7/1977 | Eisenberg | 211/88 |
| 4,708,311 | 11/1987 | Clausen et al. | 248/222.2 |

*Primary Examiner*—Ramon O. Ramirez
*Attorney, Agent, or Firm*—Fetherstonhaugh & Co.

[57] ABSTRACT

A bracket for attachment of an electric meter box (termed, in the trade, a meter base or socket) to a wall wherein the bracket is comprised of a mounting strap and at least one hook. The mounting strap, when in position attached to the rear wall meter base extends beyond the perimeter of the base with means for attaching the strap to the wall. The hook or hooks provide the means for attaching the meter base to the bracket and extend from the mounting strap and terminate in a curve adapted to hold the meter base against the mounting strap.

3 Claims, 2 Drawing Sheets

BRACKET FOR USE IN SECURING AN ELECTRIC METER BASE

This invention relates to a bracket for use in securing a electrical meter base or socket against a flat surface such as a wall.

When electric meters are installed, they are generally affixed to an exterior wall of a building. For security and protection from the elements, the meter is secured within a metal box or frame which covers the meter with opaque metal above, below, on both sides and behind the meter. The metal box or frame is referred to, in the trade, as a meter base or as a meter socket. It will be referred to herein as the meter base. The face of the meter base generally consists of a central protruding portion covered in a translucent material that allows the meter to be read and the surrounding opaque metal portion. The base is locked to prevent tampering. Four or more holes are provided in the rear wall of the base that abuts against the wall and fasteners are driven through the holes to secure the meter base to the wall. The meter base must therefore be opened when it is secured to the wall and once so secured, the base is closed and locked.

In time, the screws which secure the meter base to the wall tend to work loose from the wall or the plugs in which they are set and as a result the meter base tends to pull away from the wall. In addition to the force of gravity, deterioration of the wall itself and the forces of wind, rain and snow all exert pressure on the base and assist in the downward movement of the base and gradual pulling away from the wall. While the meter itself generally remains the property of the electrical company, the meter base generally belongs to the home or building owner, who is therefore responsible for its maintenance. Therefore, when the meter base falls away from the wall the home or building owner will usually retain an electrician to make the repair. The electrician contacts the electrical company which must then dispatch personnel to the sight to turn off the electrical power and remove the meter to allow the electrician to re-fasten the meter base to the wall. The electrical company employee is then able to replace the meter and restore power to the building.

The procedure for reattachment of a meter base that is described above is both time consuming and costly. Personnel both on behalf of the home or building owner and the electrical company are required in order to make the necessary repair.

One advantage of the bracket of this invention is that it can be attached to the back of the meter base and then secured to the wall, without the need to open the base, turn off the electrical power or removing the electrical meter to re-attach the meter base to the wall. The repair work can thus be carried out by any competent person.

Furthermore, because the mounting passages of this bracket are more widely spaced than those of the rear wall of the meter base, the use of my bracket will permit the base to be relocated in substantially the same location as that in which it was originally installed.

The invention consists of a bracket for attachment of a meter base to a wall comprising a mounting strap which, when engaged with said electric meter base, extends beyond the perimeter of said base with means for attaching the bracket to the wall and, at least one hook portion extending from the mounting strap terminating in a shallow curve or hook adapted to hold the electric meter base against the mounting strap.

The invention also consists of a bracket for attachment of an electric meter base to a wall comprising a mounting strap portion which is greater in width than the width of the electric meter base having, in at least one extremity of the width of said mounting strap, means for attachment of said bracket to a wall; and, at least one hook portion extending from said mounting strap terminating in a shallow curve such that the bracket can be angled so as to insert the hook into holes provided for attachment in the back of the electric meter base and when fully inserted within said holes the bracket lies flush against said base and when in said flush position the terminal end of said hook abuts against the inner back wall of said base and cannot be removed from said hole.

The invention further consists of a bracket for attaching an electric meter base to an exterior wall of a building, the base having at least one pair of mounting passages opening through its rear wall, each pair of mounting passages being spaced a predetermined first distance from an adjacent end of the base, the rear wall of the base having a predetermined width between its side edges, said bracket comprising a mounting strap having a front face extending in a first plane, a pair of end portions at opposite ends thereof and an upper edge, said strap having a length between said end portions which is at least equal to said predetermined width of the rear wall of the base whereby said end portions may project laterally from the side edges of said base in use, and openings opening through said opposite end portions for mounting said bracket on a wall with the front face remote from the wall; a pair of hook members each having a shank portion and a curved end portion which projects from the shank portion and terminates at a free distal end, the curved end portion being proportioned to extend through the mounting passages in a free fitting sliding relationship, the hook members being mounted on or formed from the mounting strap and spaced from one another so as to be alignable with said mounting passages, said hook portions being arranged to extend from the upper edge of the strap and projecting from said first plane in an arc of curvature which initially extends forwardly from the front face of said strap and then back toward the first plane to locate said distal end in a spaced relationship with respect to said first plane to form a box retaining gap therebetween which is narrower than said first distance such that in use hook member must be threaded through the mounting passages before the bracket is mounted on a wall and the base cannot be removed from the hook members when the bracket is secured to the wall.

The invention also consists of, in combination, an electric meter base to a wall comprising a base having at least one pair of mounting passages opening through its back wall, each pair of mounting passages being spaced a predetermined first distance from an adjacent end of the base, the back wall of the base having a predetermined width between its side edges and a bracket comprising a mounting strap having a front face extending in a first plane, a pair of end portions at opposite ends thereof and an upper edge, said strap having a length between said end portions which is at least equal to said predetermined width of the back wall of the base whereby said end portions may project laterally from the side edges of said base in use, and mounting passages opening through said opposite end portions for mounting said bracket on a wall with the front face remote from the wall, and a pair of hook members each having a shank portion and a hook shaped end portion which projects from the shank portion and terminates at a free distal end, the hook shaped portion being proportioned to extend through the mounting passages in a free fitting sliding relationship, the hook members being mounted on the mounting strap and spaced from one another so as to be alignable with said mounting passages, said hook portions being arranged to extend from the upper edge of the strap and projecting from said first plane in an arc of curvature which initially extends forwardly from the front face of said strap and then back toward the first plane to locate said distal end in a spaced relationship with respect to said first plane to form a box retaining gap therebetween which is narrower than said first distance such that in use hook member must be threaded through the mounting passages before the bracket is mounted on a wall and the box cannot be removed from the hook members when the bracket is secured to the wall.

In drawings which illustrate embodiments of the invention,

Figure 1:
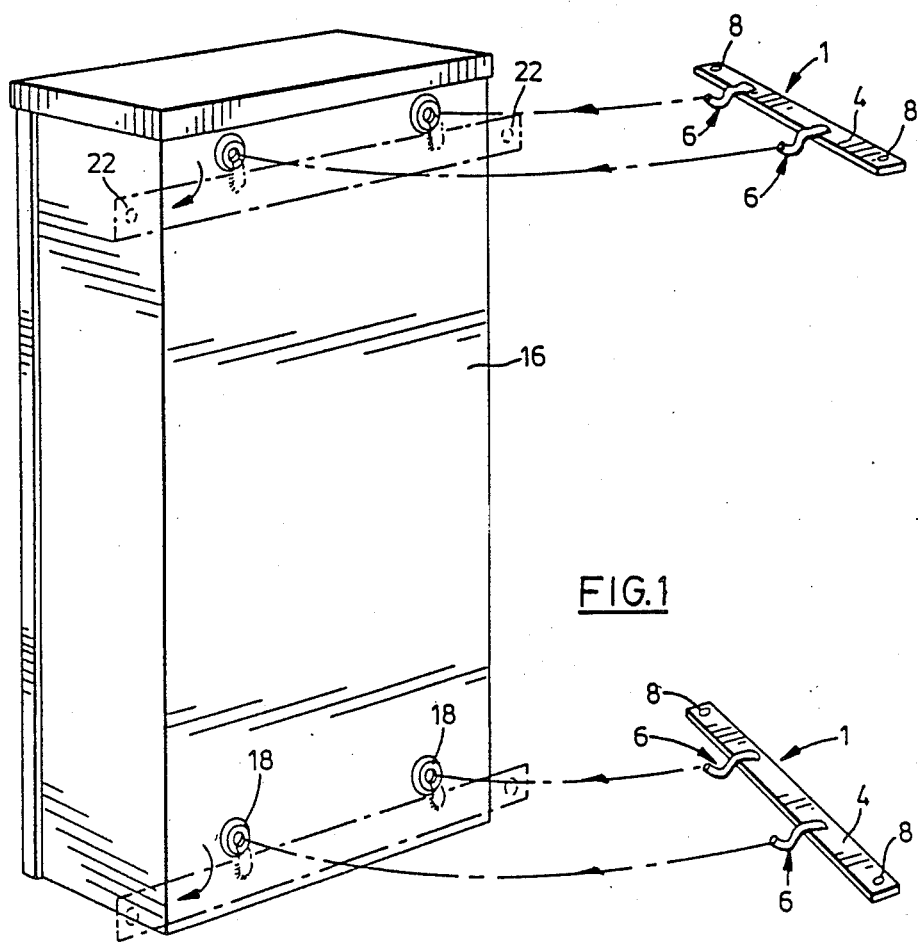
FIG. 1 is a rear view of the electric meter base showing the method of insertion of the bracket.

With reference to FIG. 1 of the drawings, reference numeral 1 refers generally to a bracket for attachment of a meter base to a wall. The bracket comprises a mounting strap 4 and a pair of hooks 6. The bracket 1 can be formed of a variety of rigid materials such as plastic or ceramics, but the most common material would be a metal, such as steel. The mounting strap 4 has openings 8 which are used to attach the bracket 1 to a wall and which are provided at each extremity of the mounting strap 4 to allow fasteners to be driven through the openings 8 and into a wall thereby securing the mounting strap 1 flat against the wall. While in the embodiment illustrated the mounting strap 4 is a solid bar, the mounting strap 4 may, alternatively, be made adjustable to accommodate various sizes of meter bases. An adjustable mounting strap would allow the means of attachment, in this case openings 8, to be moved to extend beyond the perimeter of a larger meter base.

Figure 2:
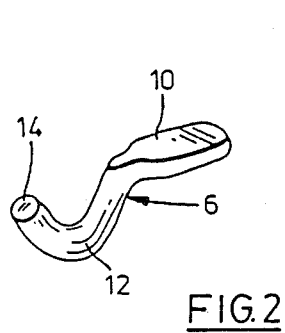
FIG. 2 is a hook prior to welding the hook to the bracket.

FIG. 2 shows the details of a hook 6 which comprises a shank portion 10 which is welded or otherwise affixed to the mounting strap 4 as shown in FIG. 1 and a curved end portion 12 which extends from the mounting strap 1 and terminates at the tip 14. The curved end portion 12 of the hook 6 is so angled as to secure the hook 6 firmly against the interior wall of the meter base 16 when the bracket 1 is affixed to the meter base 16 as shown in FIG. 1 and further described below.

Figure 3:
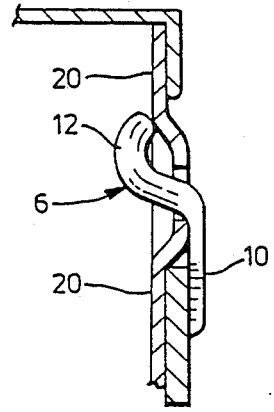
FIG. 3 is a cross sectional view of the invention in a functional position.

As shown in FIG. 3, when in place, the mounting strap 4 and the shank portion 10 of the hook 6 lie flat against the wall of the meter base 16. The curved end portion 12 of the hook 6 enters a mounting passage 18 in the rear wall of the electric meter base 16. The angle of the curve 12 is such that at least some portion of the tip 14 abuts against the interior of the wall 20 of meter base 16. The hook 6 is so aligned in relation to the mounting strap 4 as extend from the upper end of the strap 4 and project from the first plane of the front face thereof in an arc of curvature which extends first forwardly of the front face of the strap 4 and then back toward the first plane so that the distal end of the hook 6 is located in a spaced relationship with respect to the first plane that creates a gap which is more narrow than the distance of the mounting passage 6 from the adjacent end of the base. Thus, when the bracket 1 is in place as shown in FIG. 3 and affixed to a wall as shown in FIG. 4 the hook 3 cannot be withdrawn from the mounting passage 18 and the electric meter base 14 cannot be removed from the wall.

FIG. 1 shows one method of affixing the bracket to the meter base 16. Mounting passages 18 are provided in the rear wall of the meter base 16. The hooks 6 are inserted into the mounting passages 18. Due to the curved portions 12 of the hooks 6 the bracket must be manipulated so as to introduce the tip 14 of the hook portion 6 into the mounting passages 18 and then insert the curved portion 12 while lowering the shank portion 10 and mounting strap 4 to lie flat against the exterior surface of the rear wall of the electric meter base 16. Various modifications will be apparent to those skilled in the art. In one such modification, the bracket 1 may be affixed to the meter base 14 from above so that the shank 10 and strap 4 are raised after the introduction of the hooks 6 to lie flat against the exterior surface of the rear wall of the base 16, but above the mounting passages and hooks rather than below as shown in FIG. 1. When in place in either manner, the tip 14 of the hook will abut against the interior wall of the electric meter base 16 as shown in FIG. 3 and described above and the bracket will be secured against the wall of the meter base 16. The bracket can then be affixed to a wall, one method of which is shown in FIG. 4.

Figure 4:
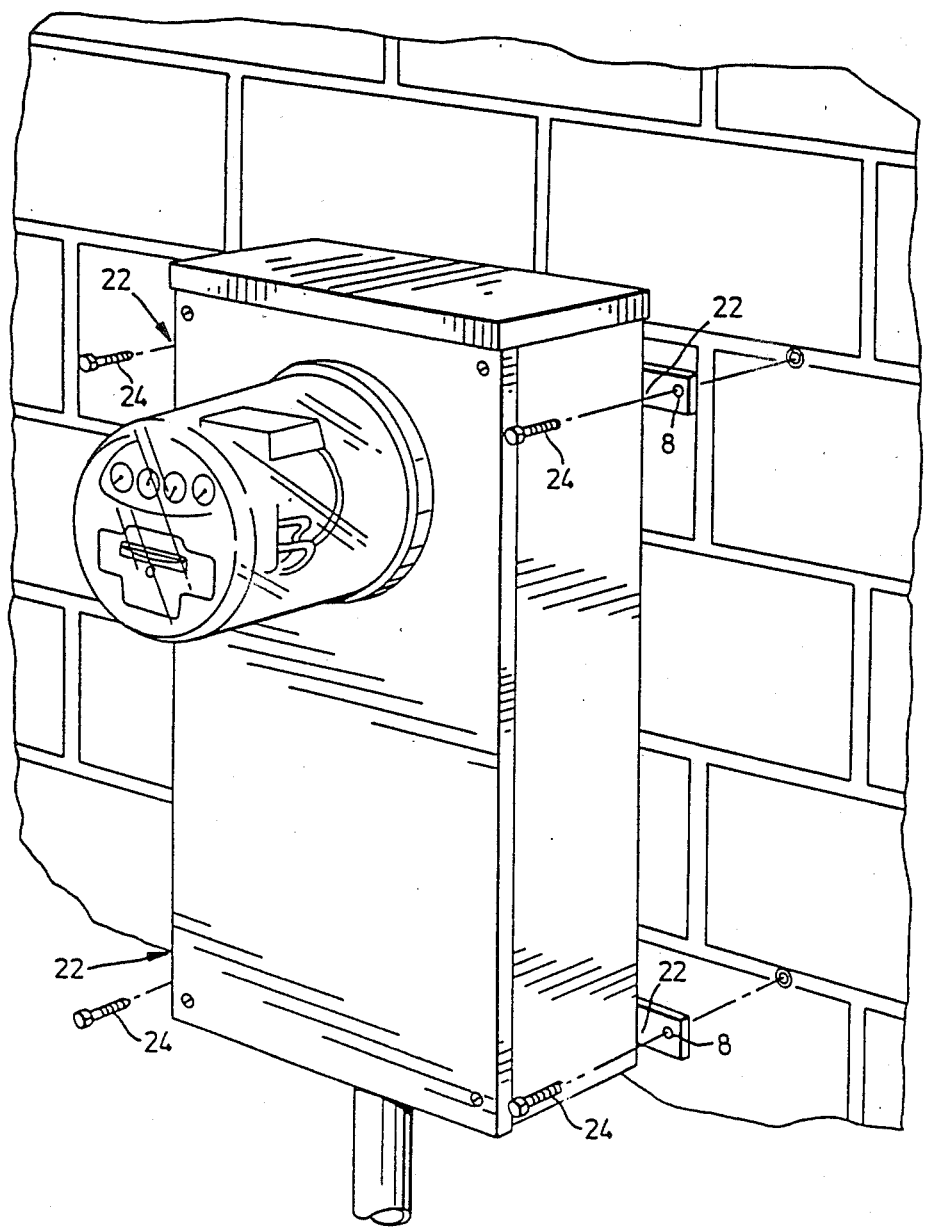
FIG. 4 is an elevation showing the method of attachment of the invention to a wall.

As shown in FIG. 4, it is essential that at least some portion of the bracket 1 extend beyond the perimeter of the electric meter base 16 to allow the base 16 and the bracket 1 which is in place flat against the rear wall of the base to be placed flush against the wall and then the bracket 1 affixed to the wall. In the embodiment shown in FIG. 4, the strap 4 of the bracket 1 extends beyond both sides of the base at numeral 22 best seen in FIG. 1. As seen in FIG. 4, fasteners 24 are driven through the openings 8 and the bracket 1 is thus affixed to the wall. It will be understood that other means could be employed to affix the extension 22 of the mounting strap 4 to the wall.

The embodiments of the invention in which an exclusive property or privilege is claimed are defined as follows:

1. A bracket for attaching an electric meter base to an exterior wall of a building, the base having at least one pair of mounting passages opening through its rear wall, each pair of mounting passages being spaced a predetermined first distance from an adjacent end of the base, the rear wall of the base having a predetermined width between its side edges, said bracket comprising;

(a) a mounting strap having a front face extending in a first plane, a pair of end portions at opposite ends thereof and an upper edge, said strap having a length between said end portions which is at least equal to said predetermined width of the rear wall of the base whereby said end portions may project laterally from the side edges of said base in use, and openings opening through said opposite end portions for mounting said bracket on a wall with the front face remote from the wall;

(b) a pair of hook members each having a shank portion and a curved end portion which projects from the shank portion and terminates at a free distal end, the curved end portion being proportioned to extend through the mounting passages in a free fitting sliding relationship, the hook members being mounted on or formed from the mounting strap and spaced from one another so as to be alignable with said mounting passages, said hook portions being arranged to extend from the upper edge of the strap and projecting from said first plane in an arc of curvature which initially extends forwardly from the front face of said strap and then back toward the first plane to locate said distal end in a spaced relationship with respect to said first plane to form a box retaining gap therebetween which is narrower than said first distance such that in use hook member must be threaded through the mounting passages before the bracket is mounted on a wall and the base cannot be removed from the hook members when the bracket is secured to the wall.

2. In combination, an electric meter base and a bracket for attachment of said base to a wall comprising:
   (a) a base having at least one pair of mounting passages opening through its back wall, each pair of mounting passages being spaced a predetermined first distance from an adjacent end of the base, the back wall of the base having a predetermined width between its side edges,
   (b) a bracket comprising:
      (i) a mounting strap having a front face extending in a first plane, a pair of end portions at opposite ends thereof and an upper edge, said strap having a length between said end portions which is at least equal to said predetermined width of the back wall of the base whereby said end portions may project laterally from the side edges of said base in use, and mounting passages opening through said opposite end portions for mounting said bracket on a wall with the front face remote from the wall,
      (ii) a pair of hook members each having a shank portion and a hook shaped end portion which projects from the shank portion and terminates at a free distal end, the hook shaped portion being proportioned to extend through the mounting passages in a free fitting sliding relationship, the hook members being mounted on the mounting strap and spaced from one another so as to be alignable with said mounting passages, said hook portions being arranged to extend from the upper edge of the strap and projecting from said first plane in an arc of curvature which initially extends forwardly from the front face of said strap and then back toward the first plane to locate said distal end in a spaced relationship with respect to said first plane to form a box retaining gap therebetween which is narrower than said first distance such that in use hook member must be threaded through the mounting passages before the bracket is mounted on a wall and the box cannot be removed from the hook members when the bracket is secured to the wall.

3. A bracket for attaching an electric meter base to a wall, the base having at least one mounting passage opening through its rear wall, the said bracket comprising:
   (a) a mounting strap having a pair of end portions at opposite ends thereof, said strap having a length between said end portions whereby said end portions may project laterally from the side edges of said base in use and openings opening through said opposite end portions for mounting said bracket on a wall;
   (b) at least one hook member having a shank portion and a curved end portion which projects from the shank portion and terminates at a free distal end, the curved end portion being proportioned to extend through the mounting passage in a free fitting sliding relationship, said hook member being arranged to extend from the strap and projecting therefrom in an arc of curvature which initially extends forwardly from the front face of said strap and then back toward the front face to locate said distal end in a spaced relationship with respect to said mounting strap such that in use hook member must be threaded through the mounting passage before the bracket is mounted on a wall and the base cannot be removed from the hook member when the bracket is secured to the wall.

* * * * *